United States Patent [19]
Levin

[11] Patent Number: 6,034,365
[45] Date of Patent: Mar. 7, 2000

[54] MULTIPLE EXPLOSION TIMING DETECTION DEVICE USING PHOTODETECTOR ARRAY

[75] Inventor: Don Maer Levin, Balto., Md.

[73] Assignee: The United States of America as represented by the Secretary of the Army, Washington, D.C.

[21] Appl. No.: 08/951,005

[22] Filed: Oct. 15, 1997

[51] Int. Cl.$^7$ ........................................................ G01J 1/42
[52] U.S. Cl. ..................... 250/206.2; 250/208.2; 356/222
[58] Field of Search .............................. 250/208.2, 206.2; 356/218, 219, 222

[56] References Cited

U.S. PATENT DOCUMENTS

| | | | |
|---|---|---|---|
| 3,937,951 | 2/1976 | Krider | 250/206.2 |
| 3,953,137 | 4/1976 | Balut et al. | 356/222 |

*Primary Examiner*—Stephone B. Allen

[57] ABSTRACT

A device detects the times of multiple explosions to within a microsecond without the need for precise aiming. The device uses a linear array of photodetectors to detect light from the explosions. Each photodetector views a different area, so that explosions occurring in different areas are viewed by different photodetectors. To increase the sensitive area of each photodetector while keeping the device compact, the photodetectors are elongated in a direction orthogonal to the direction in which they are arrayed. A filter is used to transmit only the light produced at the beginning of each explosion.

12 Claims, 2 Drawing Sheets

MULTIPLE EXPLOSION TIMING DETECTION DEVICE USING PHOTODETECTOR ARRAY

FIELD OF THE INVENTION

The invention is directed to a system for detecting the timing of multiple explosions and is intended particularly for detecting the timing of explosions taking place in multiple warheads used to defeat reactive armor targets.

1. Description of Related Art

A multiple warhead includes a tip charge designed to defeat reactive (exploding) armor and a main charge designed to defeat the remaining armor on tanks and armored personnel carriers. In experiments conducted to assess the weapon and vehicle performance, the timing between explosions must be measured to within one microsecond.

Various attempts have been made to solve the problem of measuring this timing, including the use of a single optical detector with electronics connected to an oscilloscope. The known attempts have been successful only when conditions such as aiming have just happened to be sufficient for data collection.

2. Summary of the Invention

It is an object of the invention to provide a system for detecting the timing of multiple explosions without depending on fortuitous circumstances such as aiming.

To achieve this and other objects, the present invention is directed to a device for detecting a plurality of events that generate light, the device comprising: an array of detectors, each detecting a portion of the light and for generating an output; threshold detecting means, receiving the outputs from the array of detectors, for determining when any of the outputs exceeds a predetermined threshold value and outputting a trigger signal accordingly; and storage means, receiving the outputs and the trigger signal, for storing the outputs for a predetermined time period after the trigger signal.

It is desirable to design the detectors in the array so that the detectors have large sensitive areas, while the array covers only a small field of view. Otherwise, a particular detector might not detect a particular explosion because the image of that explosion on that detector might fall outside the most sensitive area of the detector. Therefore, it is preferable to design the detectors to be narrow in the direction of the array, which is aligned with the direction of detonation, but long in the orthogonal direction.

It is also desirable to include wavelength filters. According to experience in testing warheads, an explosion typically releases blue (~450 nm) light for a very short duration, followed by infrared light. It is preferable to include narrow-band filters to pass the blue light, in combination with infrared blocking filters because the narrow-band filters do not by themselves block all infrared light.

Inclusion of a computer allows the user to communicate with the device both before and after testing. The computer can save multiple test results, thus removing the need to return to the target between tests.

BRIEF DESCRIPTION OF THE DRAWINGS

An embodiment will now be set forth in detail with reference to the drawings, in which.

DETAILED DESCRIPTION OF THE INVENTION

Figure 1A:
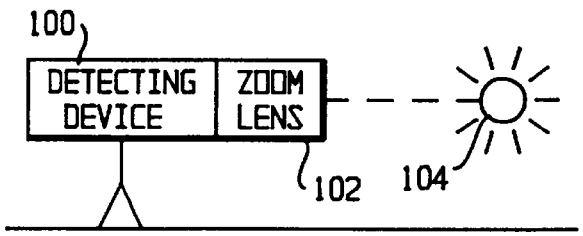
FIG. 1A shows a schematic diagram of an arrangement according to the invention used to detect explosions.
Figure 1B:
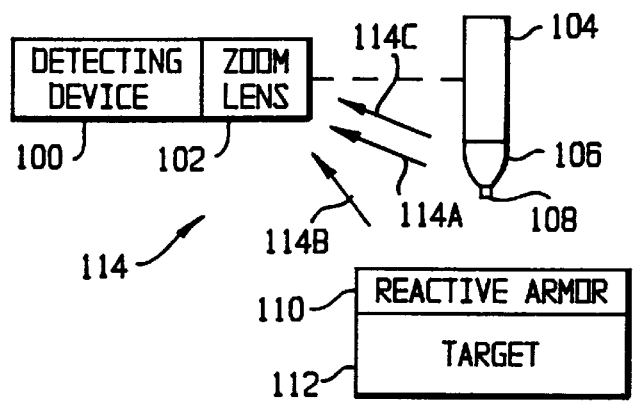
FIG. 1B shows a top view of the arrangement of FIG. 1A.

FIGS. 1A and 1B schematically show respective side and top views of an arrangement according to the invention used to detect explosions. As shown, a detecting device 100 outfitted with zoom lens 102 is positioned to view explosions that occur as missile 104 having main charge 106 and tip charge 108 strikes reactive armor 110 on target 112, thus causing explosions that produce light 114. Light 114 includes light 114A from the explosion of tip charge 108, light 114B from the explosion of reactive armor 110, and light 114C from the explosion of main charge 106.

Figure 2:
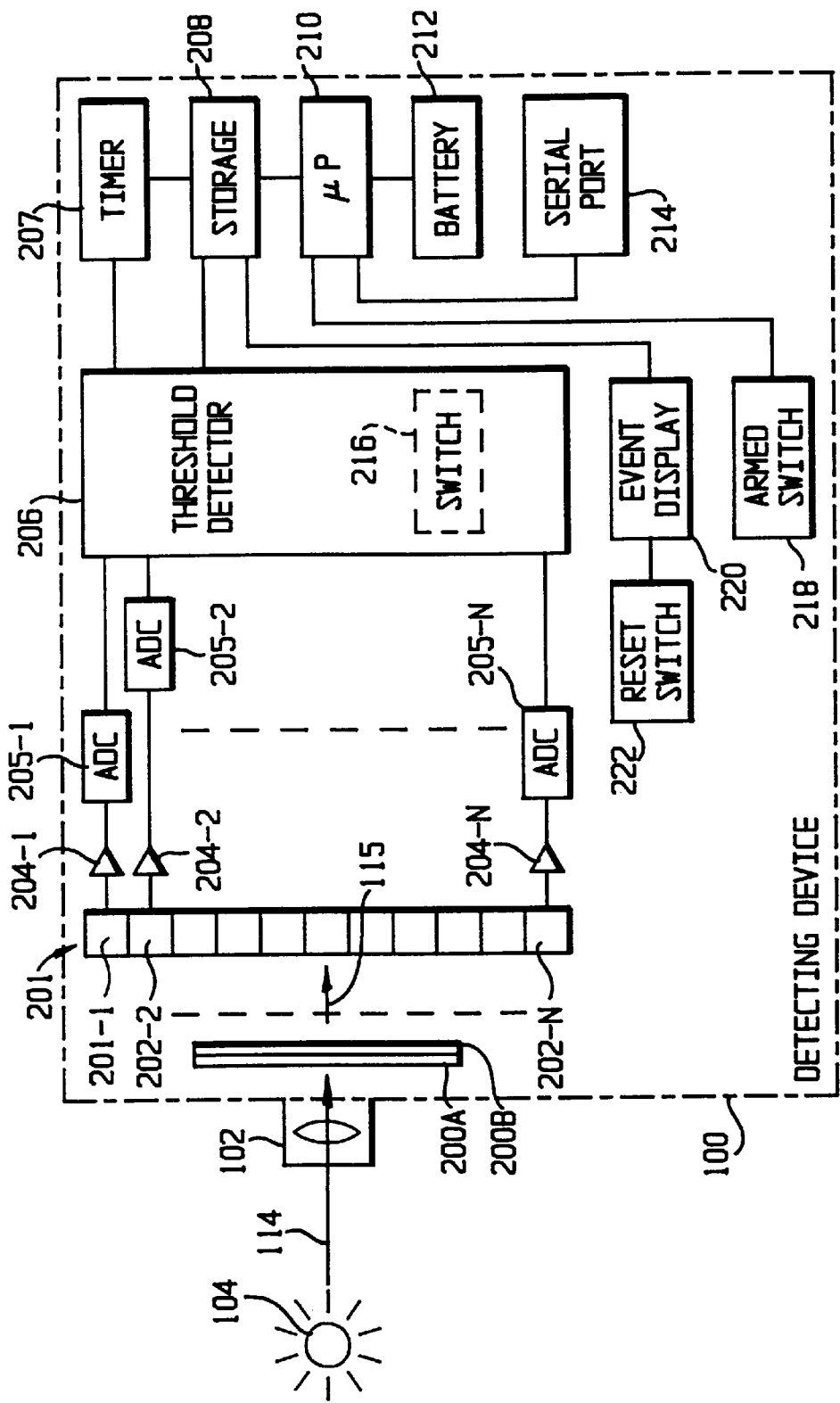
FIG. 2 shows a schematic block diagram of the device according to the invention.

FIG. 2 shows a block diagram of detecting device 100. Light 114 from the explosion of missile 104 is collected by the zoom lens 102 and is filtered through blue narrow-pass filter 200A and infrared blocking filter 200B to produce filtered light 115. The filters 200A and 200B extract the blue (~450 nm) wavelengths emitted at the time of each explosion and exclude wavelengths persisting after the explosion. The latter wavelengths could otherwise saturate the detectors. Zoom lens 102 and filters 200A and 200B could be reversed in order.

The device has a detector array 201 of N photodetectors 202-1, 202-2, . . . , 202-N for receiving the filtered light 115 from the explosion of missile 104. The output of each photodetector 202-1 . . . 202-N is amplified by a corresponding amplifier 204-1, 204-2, . . . , 204-N and is converted into an eight-bit word by a corresponding analog-to-digital converter (ADC) 205-1, 205-2, . . . , 205-N. Each photodetector provides a separate channel of data.

Threshold detector 206 is responsively coupled to the outputs of ADC's 205-1 . . . 205-N and has switch 216 for selecting a threshold. Threshold detector 206 scans the outputs to determine which output first exceeds the threshold. In response to such a determination, the threshold detector 206 produces a trigger signal to control storage of data. Alternatively, a separate threshold detector could be provided for each amplifier.

Storage device 208 coupled to threshold detector 206 stores the outputs of the detectors for a predetermined time after receipt of the trigger signal and is accessible by a computing device such as microprocessor 210. A single trigger signal starts data acquisition for all channels. The storage device 208 preferably has a non-volatile component such as non-volatile RAM or a hard drive. For each channel, 1,024 data points are stored, one for each interval of one microsecond, for a total time interval of 1.024 millisecond.

Timer 207 outputs clock pulses and counts the clock pulses until the appropriate number is reached to control the taking of the data points. Timer 207 produces one clock pulse every millisecond and counts from 0 to 1,023.

For comparison purposes, it can be useful to collect data from times before the trigger signal. In such cases, 128 data points in each channel can be taken when the device becomes ready to collect data. The device then waits for the trigger to collect the remaining 896 data points in each channel.

Battery 212 provides power for the device. The battery can be charged by any suitable charging system.

A user can communicate with the device by way of any suitable communication port, such as serial port 214, and thereby download the stored outputs to a PC or the like. The data can be downloaded with any suitable software, such as Procomm Plus for DOS or Windows.

Device 100 is armed (placed in the active state) via armed switch 218. The device can also be configured to wait for one minute after data have been taken and then rearm itself.

Event display 220 displays the number of events stored in storage 208. It can be a seven-segment LED display capable of showing any digit from zero through nine. The count shown by the event display can be reset by using reset switch 222. Data from the events remain in the non-volatile component of storage device 208 until overwritten, whether or not the count is reset.

Figure 3:
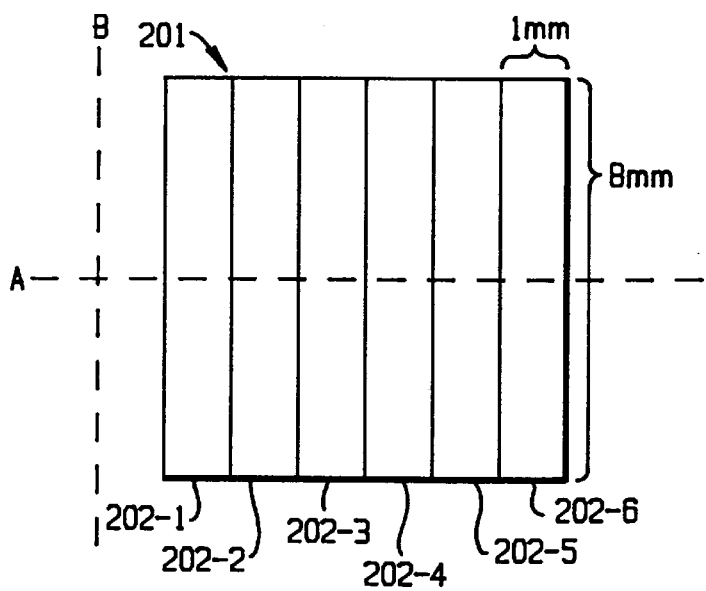
FIG. 3 shows a detector array for use in the device of FIG. 2.

FIG. 3 shows the detector array 201 for use in the device in greater detail. The detector array 201 may include, for example, six photodetectors 202-1, 202-2, 202-3, 202-4, 202-5, and 202-6, each of which measures 1 mm in its shorter direction and 8 mm in its longer direction. The shorter directions are aligned along axis A, which is in turn aligned to be parallel to the axis along which the explosions will be separated. The longer directions are aligned along axis B, which is orthogonal to axis A. When the detector array 201 is located at the focus of a 35 mm camera with a 70–210 mm zoom lens, the area viewed by each photodetector is about 17 inches by 136 inches.

In operation, each of the channels observes a different portion of the region in which the explosions take place, and data are taken every microsecond. Thus, explosions occurring in different portions of the region and at different times can be discerned independently, and the time between such explosions can be measured to within a microsecond.

Figure 4:
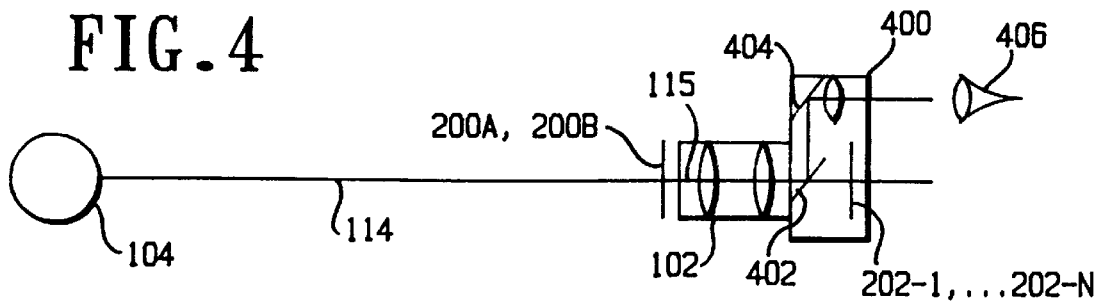
FIG. 4 shows a camera body incorporating the array of FIG. 3.

The detecting device 100, or at least the photodetector array 201, can be incorporated into a camera body 400, as shown in FIG. 4. Light 114 from the explosion passes through zoom lens 102 and filters 200A, 200B to form filtered light 115, which enters camera body 400. Beam splitter 402 transmits one-half of the light 115 to photodetectors 202-1, . . . , 202-N and the other half of the light 115 via viewfinder 404 to human eye 406, thus allowing the user to aim the camera body. The viewfinder 404 can include a frame for aiming.

A working model of the preferred embodiment, known as the Warhead Detonation Timing Measurement System, has been built and tested. The specifications of the Warhead Detonation Timing Measurement System will now be given. Of course, these specifications are to be considered illustrative rather than limiting, as they refer to one specific working device.

Specifications

Package
  Weight, 21 pounds, approximately
  Size, 1 cubic foot, approx.
  Material, Aluminum
  Color, White
  mounting, ¼" 20 threaded hole provided on bottom side for tripod
  Handles, for carrying, located on sides
Battery
  12V 4.6 AH Lead-acid battery (battery 212 of FIG. 2) supplies power.
  Current drain, 330 mA standby, 440 mA operating, approximately
  A rear panel green LED indicates when battery has more than approximately 5 hours charge life remaining; the LED is on when the battery charge is good, which is above 13.2 V.
  Charge life is 5 hours minimum from fully charged battery.
  Battery charge condition is available through the RS-232 port.
  13.6 V for fully charged battery with charger on, 13.2 V for 5 hr (armed) life, 10.8 V for low battery. An external power source may be connected for longer battery life, use 16±V ac or 18±V dc, 400 mA, isolated from the ac line.
Charger
  Wall transformer, 120 VAC. 60 Hz input. 1 A, 16 Vac output connects to front panel with a 3.5 mm P-1 connector
  LED indicates charging when the charger is connected and on.
Data output
  Serial output using Kermit protocol, 19.6 kbaud, 8 bit no parity. 1 stop bit
  Connector, DB9 male on front panel (shown in FIG. 2 as serial port 214).
  Terminal communications are in ASCII on the display. Trigger thresholds and signal levels are in hex format, with 1 bit equal to 20 mV.
  Battery levels are in hex format with 1 bit equal to 80 mV.
Lens
  70–210 mm Macro, Vivitar f4.5–5.6 1:4x type PK-AR (lens 102 of FIG. 2)
  52 mm lens diameter, P/N 217186 with adapter for matching to Pentax camera body. Equivalent lens for other cameras used.
Camera Body
  Modified SLR, Pentax K1000
Detector Array (array 201 of FIG. 2)
  Detector, Silicon Photodiode UDT Pin 10379, 6 elements of 1×8 mm each
  Element dark Current, 1 nA maximum at 5 V bias
  Element responsivity, 0.35 A/W at 600 nm, peak responsivity at approximately 900 nm
  Element Junction capacitance, 200 pf maximum
  Element load resistance, 1 kΩ
  Uniformity of Response, 5% overall
Electrical System for Signal Data
  Digital Sampling Rate, 1 MHz
  Frequency Response, 500 kHz
  Data Resolution, 8 bits
  Number of Data Acquisitions, 1024
Controls, Switches, Connectors and Indicators: These functions set, display and control the functions of the instrument and provide for information retrieval:
  Events in Memory, 7-segment bar type LED (element display 220 of FIG. 2) shows how many exposures have occurred. The event counter is reset to one using the rear panel reset switch 222, or a power off, power on cycle. The events in memory remain until overwritten with new data whether or not the event counter has been reset.
  Armed Switch 218 enables the electronics to trigger and perform a measurement sequence. The unit will automatically reset for the next event after approximately one minute. Red LED indicates when unit is armed.

Serial Interface, 9 pin, "D" connector 214 for data downloading, using "Kermit" protocol.

Thumbwheel Threshold Switch 216 sets the threshold Voltage, 4.99 Volts maximum in units, tenths, and hundredths of Volts, for a signal on any detector element to trigger a measurement event. The switch scale is voltage, which is the voltage from the amplifier section above which the trigger occurs. The noise floor of the threshold circuit is 25 mV. The threshold level should not be set for less than 30 mV, or spurious triggers may occur.

Triggered red LED shows if an event has been recorded for one minute after a trigger. The unit will rearm after this one minute period, and turn the trigger LED off.

Charging LED, green LED shows charging action from external charger. It is on when charger is connected to the AC line and the system.

"Good Battery" green LED indicator on rear panel indicates when battery is charged.

Reset Switch 222 resets event counter to 1 for beginning of up to 8 measurement events. The pre-recorded data are saved in non-volatile memory until overwritten with new data, except for the data in the indicated test number when the unit is armed.

Operating instructions

Before operation, the battery should be recharged, using the included charger, for 24 hours, or until the "Good Battery" LED is on. Alternatively, the battery voltage can be monitored for proper charge using the RS-232 serial port 214.

The unit should be placed on a holding fixture. The tripod mount is secured in the holding fixture to mount the unit.

Initial settings

At power on, the triggered light will come on for about one minute. The unit should not be used until the triggered light goes out.

The trigger level voltage should be set using the thumbwheel switches on the front panel. Previous data can be used for guidance.

If the lens requires adjustment, the access cover on the side of the system can be opened, to allow the user to perform the following:

Without neutral density filters placed on the macro lens filter adapter, look through viewfinder in camera body, adjust alignment of box for proper location of source on target. Adjust focus on macro lens for best image quality.

If required, place neutral density filters on the macro lens filter adapter.

Record the Events In Memory Number for this event, the trigger level, lens settings, focus distance and F#.

Operation

The Armed switch is pressed. The Armed LED should illuminate, whereupon the system is ready for a measurement sequence. The events counter should show "1". The sequence will begin when a detector element in the camera sees enough light to reach the trigger threshold.

After the system is triggered, the data of 1024 data points (128 data points saved prior to trigger, 896 after trigger), for each of the 6 elements of the detector will be recorded. After each trigger, the event counter will increment by one.

Device 100 is configured to wait for a one-minute dead time between events; during this time the unit cannot be triggered. After the one-minute period the Armed LED will be on, and the unit will record the next event when triggered.

After eight events, the unit will be disabled from triggering, as the maximum number of events will have been recorded, and the Armed function will be automatically cleared.

The power can be turned off for data security. The data are saved in Non-volatile RAM. The data should be downloaded through the RS-232 port.

Pushing the reset switch will reset the event counter to "1". Data in event "1" will be overwritten when the unit is armed.

When the device is armed, the previous test data on the indicated test number will be overwritten. This is because the pre-trigger data (128 data points) must be retained when the unit is next triggered. After a reset or power down, the unit will only start on test number "1". All test data are retained and available for download. Data should be downloaded only when the device is in the unarmed state.

Theory of Operation

Analog Gain Stages

When light from the telephoto lens on the camera is imaged onto the photodiode array mounted at the camera focus, a current proportional to the optical power received is generated. Normal optical signals (explosions) will generate current in the micro-amp range. The first stage of electronics provides a low impedance load and voltage gain.

There are six identical channels, one for each photodiode, of first stage amplifiers. The six front end amplifiers drive six A/D converters.

Trigger Operation

When armed, the unit uses the optical input signals to decide when to take and store data. Analog comparators monitor the amplified signal and the remaining five channels. If any signal rises above the threshold set by the rear panel thumbwheel switches, the signal trigger is activated. A 4.00 Volt primary reference voltage is divided into 1 V, 0,100 V, and 0.010 V increments. These are selected by the thumbwheel switches, summed, and distributed by buffer amplifiers to the comparators. The maximum threshold voltage is 4.99 V.

Analog to Digital Converters

Each amplified photodiode output is converted to an 8-bit digital word by the A/D converter. The converters start the conversion on the negative edge of the 1 Mhz clock signal. When the conversion is complete, in less than 1 $\mu$s each, the converter generates a pulse that is used to control writing of the data into non-volatile RAM for later analysis. The converters have 5.120 Volts full scale range. This range results in 20 mV per bit resolution of the amplified signal.

Control Logic

The unit uses the occurrence of any one the six channels detecting an over-threshold condition to start the recording of date. If the unit is armed, the one-minute timer has expired, and the test number is 8 or less. Before the trigger occurs the 1 $\mu$s interval counter is free-running from count 0 to 1023 and recycling. A register contains the count where the previous 127 data words were stored prior to the unit being triggered.

During the data acquisition period, the interval counter continues counting for 896 additional steps, storing data from each of the six A/D converters every microsecond. When the last count is detected, further data recording is halted, and the test logic increments to the next test sequence number. After 8 events have been recorded, no further triggers will be accepted.

Pushing the Reset button and rearming the unit at any point during the test will erase all data from test 1. The data will be non-recoverable.

Microcontroller

Since the data are accumulated at 1 μs intervals, the microcontroller is too slow to manipulate the data in real time, although as faster microcontrollers become available, this should no longer be the case. Data are taken solely by the digital logic with the microcontroller used for status and interfacing to the external computer through the RS232 Serial Port. Communications protocol is "Kermit."

While the unit is accumulating data, the microcontroller is prevented from accessing any data. The Armed signal controls which process is in control of the unit. If the unit is Armed, then data are accumulated; if the unit is not Armed, the microcontroller can access data and status through the RS232. The unit must not be armed when the microcontroller is trying to access the unit, as the data will be destroyed in one or more tests in memory. Power-up circuitry insures that the unit powers up not Armed.

The microcontroller is a standard 8031 with 2k×8k of nonvolatile RAM and 32k ×8k of ROM. Data memory and I/O control decodes are listed in the following table:

| I/O Register | Hex Address | Function |
| --- | --- | --- |
| Program Data Memory | 0000-07FF | Read/Write 2k × 8Ram |
| Real Time Clock/Calendar | 0800-087E | Read/Write Real Time Clock |
| Start Address, LSB | 1000 | Read LSB of Start Address |
| Start Address, MSB | 1800 | Read MSB of Star Address |
| Status Register | 2000 | Read Status |
| Battery Voltage | 2800 | Read Battery Volts 20.48V FS |
| Trigger Threshold Voltage | 3000 | Read Threshold Voltage 5.12 VFS |
| Test Data Byte 0 | 4000 | Read Byte 0 of Data |
| Test Data Byte 1 | 4800 | Read Byte 1 of Data |
| Test Data Byte 2 | 5000 | Read Byte 2 of Data |
| Test Data Byte 3 | 5800 | Read Byte 3 of Data |
| Test Data Byte 4 | 6000 | Read Byte 4 of Data |
| Test Data Byte 5 | 6800 | Read Byte 5 of Data |
| Software Reset | 7000 | Reset all Hardware Registers |
| Memory Read Address (LSB) | 1800 | Write Address Register (LSB) |
| Memory Read Address (MSB) | 2000 | Write Address Register (MSB) |

While an embodiment and the specifications of a working model have been set forth, those skilled in the art who have reviewed this specification will readily appreciate that modifications may be made within the scope of the invention. For example, various operations such as threshold detection can be performed in analog or digital mode as needed. Components disclosed as separate can be consolidated; for example, a single ADC can be used in place of ADC's 205-1, 205-2, . . . , 205-N. Likewise, an element having multiple functions can be replaced by multiple elements.

What is claimed is:

1. A device for detecting the timing of multiple events that generate sources of light, comprising:

a plurality of detectors for detecting a portion of the generated light and for producing outputs from each detector;

lens means connected to the plurality of detectors and positioned between the sources of light and the plurality of detectors for focusing the generated light onto the plurality of detectors;

filter means connected to the plurality of detectors and positioned between the sources of light and the plurality of detectors for filtering the generated light before it impinges onto the plurality of detectors, wherein the filter means comprises a pass-band filter for extracting a wavelength component of interest from the sources of light and passing the wavelength component of interest to the plurality of detectors;

threshold detecting means connected to each of the detectors, the threshold detecting means connected to each of the detectors for receiving the outputs from each of the detectors and for producing a trigger signal when the output from a detector exceeds a predetermined threshold value;

storage means connected to the threshold detecting means for receiving the trigger signal from the threshold detecting means and for storing the outputs from the detectors for a predetermined time period when the trigger signal is received; and timer means connected to the threshold detector means and the storage means for receiving the trigger signal, producing clock pulses, counting a predetermined number of the clock pulses, and controlling the storage means to store the outputs from the detectors for the predetermined time period in accordance with the predetermined number of clock pulses.

2. The device according to claim 1, wherein the filter means consists of a narrow pass-band filter and an infrared blocking filter and the light wavelength component of interest that passes through the filter means consists of a blue wavelength component of about 450 nanometers.

3. The device according to claim 1, wherein the light wavelength component of interest that passes through the filter means has a blue wavelength component of about 450 nanometers.

4. The device according to claim 1, wherein the outputs from the detectors are amplified and converted to digital form before being received by the threshold detecting means.

5. A device for detecting the timing of multiple explosions which generate sources of light, comprising:

a plurality of detectors arranged in an array of detectors for detecting portions of the generated light and for producing outputs;

filter means connected to the array of detectors and positioned between the source of light and the array of detectors for filtering the generated light before it impinges onto the array of detectors, wherein the filter means comprises a pass-band filter and an infrared blocking filter for extracting a wavelength component of interest from the generated light and passing the wavelength component of interest to the array of detectors;

threshold detecting means connected to each of the detectors for receiving the outputs from each of the detectors and for producing an output trigger signal when an output from a detector exceeds a predetermined threshold value;

storage means connected to the array of detectors and the threshold detecting means for receiving the outputs and the trigger signal and for storing the outputs from each of the detectors for a predetermined time period when the trigger signal is produced; and timer means connected to the threshold detector means and the storage means for receiving the trigger signal, producing clock pulses, counting a predetermined number of the clock pulses, and causing the storage means to store the outputs from each of the detectors for the predetermined time period in accordance with the predetermined number of clock pulses.

6. The device according to claim 5, further comprising means for receiving the trigger signals, the outputs, and the number of clock pulses occurring during predetermined time periods and for determining the time difference between the trigger signals.

7. The device according to claim 5, wherein the light wavelength component of interest that passes through the filters is a blue wavelength of on the order of about 450 nanometers.

8. The device according to claim 5, wherein the outputs from the array of detectors are amplified and converted to digital form before being received by the threshold detecting means.

9. The device according to claim 5, further comprising a lens means connected to the array of detectors and positioned between the source of the light and the array of detectors for focusing the generated light onto the array of detectors.

10. A device for detecting the timing between sequential explosions in a missile, wherein each explosion generates a source of light, comprising:

a plurality of detectors for producing outputs;

filter means connected to the detectors and positioned between the source of the light and the detectors for filtering the generated light before it impinges onto the detectors, wherein the filter means includes a pass-band filter for extracting a wavelength component of interest from the light and passing the wavelength component of interest to the detectors, wherein the light wavelength component of interest that passes through the filters has a blue wavelength component of about 450 nanometers;

threshold detecting means connected to the detectors for receiving the outputs from each of the detectors and for determining when an output exceeds a predetermined threshold value and outputting a trigger signal accordingly, wherein the outputs from the detectors are amplified and converted to digital form before being received by the threshold detecting means;

storage means connected to the detectors and the threshold detecting means for receiving the outputs and the trigger signal and for storing the outputs from the detectors for a predetermined time period when a trigger signal is received; and timer means connected to the threshold detector means and the storage means for receiving the trigger signal, for producing clock pulses, counting a predetermined number of the clock pulses, and for controlling the storage means to store the outputs from the detectors for the predetermined time period in accordance with the predetermined number of clock pulses.

11. A method for evaluating the timing between multiple explosions with a plurality of detectors where each explosion generates a source of light, comprising the steps of:

(a) filtering the light generated by each explosion to extract a wavelength component of interest;

(b) detecting the wavelength component of interest with the detectors and producing output signals when the wavelength component of interest is detected;

(c) receiving the output signals and producing an output trigger signal when an output signal exceeds a predetermined threshold value;

(d) storing the output signals from the detectors for a predetermined time period when the output trigger signal is produced; and (e) evaluating the output signals and the output trigger signals for the predetermined time period to determine the timing between explosions.

12. A method for detecting the timing between multiple detonations with a plurality of detectors where each detonation generates a source of light, comprising the steps of:

(a) filtering the light generated by each detonation to extract a wavelength component of interest comprising a blue wavelength component of about 450 nanometers;

(b) detecting the presence of the wavelength component of interest with the detectors for each of the detonations and generating output signals when the wavelength component of interest is detected;

(c) receiving the output signals and producing a trigger signal when the output signals exceed a predetermined threshold value;

(d) storing the output signals from the detectors for a predetermined time period when the trigger signal is produced; and (e) measuring the output signals and the trigger signals to determine the timing between the detonations in accordance with a predetermined time base.

* * * * *